(12) United States Patent
Ferlitsch

(10) Patent No.: US 7,190,477 B2
(45) Date of Patent: Mar. 13, 2007

(54) SYSTEM AND METHOD FOR MANAGING AND PROCESSING A PRINT JOB USING PRINT JOB TICKETS

(75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 864 days.

(21) Appl. No.: 10/096,689

(22) Filed: Mar. 12, 2002

(65) Prior Publication Data

US 2002/0114004 A1 Aug. 22, 2002

(51) Int. Cl.
*G06F 15/00* (2006.01)
(52) U.S. Cl. .............. 358/1.15; 358/1.16; 709/201; 709/202; 709/203
(58) Field of Classification Search ........... 358/1.14; 709/201, 202
See application file for complete search history.

(56) References Cited

U.S. PATENT DOCUMENTS

| | | | | |
|---|---|---|---|---|
| 5,818,845 | A * | 10/1998 | Moura et al. | 370/449 |
| 6,115,132 | A * | 9/2000 | Nakatsuma et al. | 358/1.14 |
| 6,476,927 | B1 * | 11/2002 | Schwarz, Jr. | 358/1.15 |
| 6,519,053 | B1 * | 2/2003 | Motamed et al. | 358/1.16 |
| 6,874,034 | B1 * | 3/2005 | Hertling | 709/245 |

OTHER PUBLICATIONS

Managing spool documents, http://www.barrcentral.com/support/documents/help/beps/Managing_spool_documents.htm.*
Learning about the Spool Window, http://www.barrcentral.com/support/documents/help/beps/Learning_about_the_Spool_Window.htm#Document_list.*
What is spooler?, http://www.webopedia.com/TERM/s/spooler.html.*
Spool Header Definition, http://www.barrcentral.com/support/documents/help/beps/BEPS.htm.*

* cited by examiner

*Primary Examiner*—Mark Zimmerman
*Assistant Examiner*—Vincent Rudolph
(74) *Attorney, Agent, or Firm*—Kirton & McConkie; Michael F. Krieger

(57) ABSTRACT

The present invention features a computer based printing system comprising a client computing device, or optionally a server computing device; one or more printer drivers; a print processor; a print spooler; one or more printing devices; and means for initiating a print job(s) in a local, network or remote, single or multi-user, printing environment. The print job is initiated by the printing source or the printing device. Also included is means to despool print data from a print job directly to a printing device from the printing source, according to a print job ticket, using a spooler or print processor based printing system having synchronous centralized management.

47 Claims, 15 Drawing Sheets

5. Firmware to Client - Status Update ~246

Command
    Name: OpenPrinter(), WritePrinter(), ClosePrinter()
    Status: Success, Failure
Printer
    DNS Name
    IP Address
    Status (Error)
Document
    Name
    Client Job ID

6. Firmware to Server - Status Update ~250

Command
    Name: OpenPrinter(), ClosePrinter()
    Status: Success, Failure
Printer
    DNS Name
    IP Address
    Status (Ready, Busy, Error, Idle)
Document
    Name
    Client Job ID

*FIG. 12B*

SYSTEM AND METHOD FOR MANAGING AND PROCESSING A PRINT JOB USING PRINT JOB TICKETS

BACKGROUND

1. Related Applications

This application claims priority to U.S. patent application Ser. No. 09/894,928 filed Jun. 28, 2001, entitled "METHODS AND SYSTEMS FOR PAGE-INDEPENDENT SPOOL FILE SHEET ASSEMBLY," which claims priority to U.S. patent applications Ser. Nos. 09/681,409 filed Mar. 30, 2001, entitled "METHODS AND SYSTEMS FOR PRINT-PROCESSOR-BASED PRINTER STATUS DETECTION AND PRINT TASK DISTRIBUTION" and Ser. No. 09/681,416 filed Mar. 30, 2001, entitled "METHODS AND SYSTEMS FOR PRINT-PROCESSOR-BASED PRINT TASK ERROR RECOVERY", both of which claim priority to U.S. patent application Ser. No. 09/681,208 filed Feb. 22, 2001, entitled "METHODS AND SYSTEMS FOR PRINT-PROCESSOR-MODIFIED PRINTING," which claims priority to U.S. patent application Ser. No. 60/261,132 filed Jan. 11, 2001 entitled "METHODS AND SYSTEMS FOR PRINT-PROCESSOR-MODIFIED PRINTING."

2. Field of the Invention

The present invention relates to a printing system, and particularly, to a printing system in a multiple printing device (or printer) environment, wherein the printing system is designed to carry out centralized management of a shared printer from multiple printing sources, such as a PC, where the printing sources directly despool, the print data to the printing device based upon instructions or requirements as contained within a print job ticket.

3. Background

With the emergence of software and hardware components of computer systems, users are able to employ the systems to perform a variety of tasks. For example, a user may utilize a software application, such as a word processor, spreadsheet, or other application, to create a file or document. Once created, the document may be printed on a local, remote, or network printing device.

In a computer system that includes various client computing devices (e.g. one or more PC's, servers, etc.) and a printing device connected via a network, the utilization of the networked system to print a file or document traditionally includes the use of print queues on a centralized computing device, commonly referred to as a print server. A print queue lines up print jobs for a particular network printing device. Thus, for example, when a number of documents are to be printed by a network printer, the documents are ordered in a print queue on the print server and pulled one at a time off the queue for printing. Print jobs are commonly executed in the same order that they were placed on the print queue, but may be prioritized based on other criteria, such as by the size or type of the documents that are to be printed.

When a user initiates a print command at one of the client computing devices, the client despools print data for the print job to a print queue that is located on the print server, which is associated with a corresponding network printer. When it is time to remove the print job from the queue, the print server despools the print data from the print queue to the network printer. While this method for network printing enables a variety of client computer devices to utilize a network printer, the method requires a large amount of network traffic since the print data of each print job must be despooled twice over the network. Furthermore, the traditional method causes a loss of bi-directional communication, resulting in a loss of error handling and/or a loss of job completion notices.

Other methods include using a print provider at the client to open a connection to the network printer through the use of a particular protocol, such as TCP/IP, Novell Netware, or Apple Talk, and attempting to spool data directly to the printer. However, since a network printer is commonly shared among a variety of clients, the printer must serialize the spooling and printing of print jobs that arrive simultaneously. As such, the printer must order subsequent attempts to despool print data, wherein one print job is blocked while another print job is being printed. Alternatively, one print job is despooled into firmware memory or onto a disk drive at the printer while another print job is being printed. These methods cause the client computer device to consume CPU cycles and/or to generate additional network traffic. Furthermore, there is no centralized management of the print jobs and thus no prioritization as to the order in which the print jobs are processed.

One attempt to reduce the amount of network traffic required in performing network printing includes an operating system at the client that allows journaled data to be despooled to the print queue rather than the traditional print data. The amount of journaled data is assumed to be less in comparison to the amount of traditional print data. Therefore, the amount of network traffic is reduced. However, this attempt requires a copy of the corresponding printer driver to be located on the print server, further requiring the maintenance and/or licensing of an extra printer driver. Moreover, this attempt does not address the loss of bi-directional communication, nor the additional costs of CPU cycles on the server to render print data, nor the overhead of journal data on network traffic. These several systems are explained below.

FIG. 1 depicts a shared printing device 108 that is being shared without print system management or centralized management. Printing device 108 is connected to client computing device 80 having an application program 84 contained thereon capable of providing print data and a means by which to initiate a print job. Client computing device 80 also includes a printer driver 88, a spooler 92, a print processor 100 and a port manager 96. application 84 writes the print information (comprising print data and print instructions) to printer driver 88, which then spools this information to spooler 92. Spooler 92 may despool the print information to port manager 96, or optionally it may utilize print processor 100 to control RAW (printer ready) data 102 or EMF (Enhanced Metafile Format) data 104. Typically, each printing source 80 (shown as a client computing device, which is interchangeably used with printing source herein, thus also being identified with the number 80), such as a client computing device 80, or a server (not shown) of some sort, competes with each other printing source (e.g., those shown as 112) connected over network 70 to establish a connection to despool a print job to printing device 108. An open connection is granted by printing device 108 to printing source 80, and printing source 80 despools the print data to printing device 108. During this period, any request by another printing source 112 to open a connection with printing device 108, thus attempting to despool their print data to printing device 108, will either be blocked, or be denied. In essence, every other printing source 112 must wait for the connection to become available before they can despool the print data to printing device 108. Upon completion of the print job, printing source 80 communicates to printing device 108 that the connection can be closed. At this time, other printing sources 112 are allowed to establish an open connection. Typically though, each printing source 112 will either have to wait for the connection to become unblocked, or continuously poll the printing device 108 for an opportunity to establish an open connection with the printing device 108.

This approach of unmanaged devices suffers in that it results in an disorderly method of establishing a connection from printing source(s) 80 or 112 to printing device 108 to download and print existing print data. Moreover, in the case of polling, it is possible that a print job could inadvertently be starved out indefinitely in the case of a heavy job request environment. Likewise, without management of the printing system, other algorithms for establishing preferences between print jobs, other than first-in-first-out, cannot be utilized as these algorithms consider factors in preference such as the size and age of each print job.

Traditionally, centralized management of shared printing devices is done with a print queue on a print server. Generally, each printing source (and also other client computing devices or printing sources) sends the print job information, RAW data and/or EMF data, and the associated print job data to the printer server, requesting that the print job be printed on one or more specified printing devices. Each printing device managed by the print server has a print queue. The print server places each print job on the corresponding print queue, wherein the print server subsequently despools each of the print jobs from the print queue to one or more of the printing devices in some organized manner, such as first-in-first-out (FIFO).

While more efficient and more user friendly than a non-managed print system, this approach suffers in that it requires the print data to be despooled over the network twice, once to the printer server from the printing source, and once to the printing device(s) from the printer server. This results in double the amount of traffic over the network, in terms of both data and time. This method also requires sufficient storage resources, such as disk space, to store the print data a second time on the printer server. An example of such a printing system or environment may be a printing system including a printing source running the Microsoft Windows 95, 98 or Me NT/2K or XP Operating System, which sends a print job to a shared printer managed by a Windows NT/2000, XP, or Novel Netware print server.

FIG. 2 illustrates the current state of the art that attempts to solve the problems of traditional centrally managed printing systems by deferring the rendering of print data to printer server 116. In such systems, each printing source 80 or 112 sends the print job information and journaled print instructions (i.e., EMF data) to printer server 116, requesting that the print job be printed on one or more specified printing devices 108. Each printing device 108 managed by print server 116 has a print queue 120 and a printer driver 136 on print server 116 associated with corresponding print queue 120. Print server 116 places each print job on corresponding print queue 120, wherein print server 116 renders or plays back the journaled print instructions to associated print driver 136. Following this, printer server 116 despools the print jobs from print queue 120 to one or more of printing devices 108 in some organized manner, such as first-in-first-out (FIFO). This solution improves on the traditional model by assuming that the journaled data is substantially smaller in size, thus requiring less disk space for storage. This solution also improves upon the traditional model by decreasing the amount of traffic over network 70, both in terms of data and time.

Although an improvement, the approach of the current state of the art suffers in that it requires the journaled print instructions to be despooled over network 70, along with print data 106. This results in a greater amount of traffic over network 70, both in terms of data and time, and also requires sufficient storage resources, such as disk space, to store the journaled print instructions on printer server 116, as well as requiring space to render each print job. This current approach also suffers in that it requires sufficient CPU resources on print server 116 to render the print data with corresponding print driver 120. It also restricts the user from selecting a print driver 136, such that the user is forced to use the pre-assigned print driver for print queue 120 on print server 116. An example of such a system is a printing source running the Microsoft Windows NT/2000 or XP Operating System, which sends a print job to a shared printer managed by a Windows NT/2K printer sever.

U.S. Pat. No. 6,115,132 to Canon, entitled "Printing System that Transmits Job Information Independently of Print Data," is an improvement over current systems. The technology disclosed in this patent provides a client computing device that transmits only job information of print data to a printer server, wherein the server manages a print order in accordance with the job information, and if printable, the client transmits the print data directly to a printer. In this invention, after the print is completed, the printer notifies the server of a print completion, and upon reception of this print completion notice, the server instructs the client to delete the print data. This invention further teaches that in a print system on a network configured as above, the network traffic is not increased, a large memory capacity is not necessary for the server, thus allowing the server load to be reduced, the job management of the server can be performed by the client, the completion of a print operation can be monitored, and a print operation is possible even if the server is in an error state. In this invention, only the print job information is transmitted over the network to the print server. The print data is later directly despooled from the printing source to the printing device(s).

This patent improves on the current art by eliminating the need to despool the print data or print instructions (i.e., journaled data) to the print server along with the print job information. Instead, only the printjob information is sent to the print server, which is maintained on a print queue. The print server grants print job requests to despool the print data in some organized manner, such as first-in-first-out (FIFO), by sending the IP address of the printing device to the printing source. The printing source, using the IP address of the printing device, establishes an open connection to the printing device and despools the print data. Upon completion, the printing source communicates to the printing device that the connection can be closed. The print server maintains availability of the printing device(s) and print job completion by continuously polling the printing device(s) for printer status, such as with SNMP.

While an improvement, the technology in this patent suffers in two major ways. First, this approach suffers in that the progress and/or state of the despooled print job on the printing devices must be maintained by periodic polling on the printing device(s), thus increasing activity on the network as well as requiring continuous CPU cycles on the print server. Second, the progress and/or state of the despooled print job can be lost or become invalid if the communication link from the print server and the printing device(s) is lost, and/or the printing device(s) become unresponsive.

SUMMARY AND OBJECTS OF THE INVENTION

The present invention seeks to solve the above-described problems of prior art centralized management of a shared printing device from multiple printing devices, in which the printing sources directly despool the print data to the printing device(s). Specifically, the present invention seeks to solve all of the above-described problems by providing a computerized printing system capable of carrying out centralized management of a shared printing device, despooling rendered data directly to the printing device from the printing source, and enabling user selection of a specific printer driver. In the system of the present invention, there is no requirement for additional disk space on the print server as the print data is kept on the printing source until ready to be printed. In addition, no additional CPU resources are required for rendering the print job on the print server or for storing progress/status information on the print server. Moreover, the printing system of the present invention is capable of handling unresponsive printing devices in such way so as to effectively manage the print jobs and maintain synchronization between the printing sources and the printing devices.

In accordance with the invention as embodied and broadly described herein, the present invention features a computer based printing system comprising: at least one printing source having at least one print job thereon to be printed, the print job comprising print data and print requirements; at least one printing device in communication with the printing source; means for initiating the print job from the printing source; a centralized print manager, such as a print server, for providing synchronous management of the print job, the centralized print manager comprising a job ticket spooler and at least one job ticket queue; at least one print job ticket generated by and constructed on a local spooler within the printing source, wherein the print job ticket comprises the print job requirements, and wherein the printing source sends the print job ticket to the job ticket spooler of the centralized print manager, the job ticket spooler managing and queuing the print job ticket in the job ticket queue; and means for initiating the despooling of the print data directly to the printing device according to the print requirements as contained on the print job ticket.

Means for initiating the despooling of the print data directly to the printing device may comprise the job ticket spooler that selects and removes the print job ticket from the job ticket queue and communicates a print job authorization message to the printing source, wherein the authorization message causes the printing source to initiate the despooling of the print data directly to one or more of the printing devices.

Means for initiating the despooling of the print data directly to said printing device may also comprise the job ticket spooler selecting and removing the print job ticket from the job ticket queue and communicating a print job authorization message to the printing device specified in the selected print job ticket, the authorization message causes the specified printing device to initiate the despooling of the print data contained on the printing source by sending a despool authorization message to the printing source, the printing source subsequently despooling the print data directly to the specified printing device.

Means for initiating the despooling of the print data directly to the printing device may further comprise a print processor that instructs the job ticket spooler to select and remove the print job ticket from the job ticket queue and communicate a print job authorization message to the printing source, wherein the authorization message causes the printing source to initiate the despooling of the print data directly to one or more of the printing devices.

Means for initiating the despooling of the print data directly to the printing device may still further comprise a print processor that instructs the job ticket spooler to select and remove the print job ticket from the job ticket queue and communicate a print job authorization message to the printing device specified in the selected print job ticket, the authorization message causes the specified printing device to initiate the despooling of the print data contained on the printing source by sending a despool authorization message to the printing source, causing the printing source to subsequently despool the print data directly to the specified printing device.

The printing system of the present invention provides significant advantages over and differs from prior art printing systems in several respects. Specifically, the present invention combines many advantageous and unique features into a printing system as taught and described herein.

Unlike some traditional prior art printing systems having centralized management, the printing system of the present invention does not copy to or store print data on the print server where it sits until it is selected for printing, but instead despools rendered print data directly to the printing device upon selection resulting from a print job ticket. In addition, the present invention allows for user selection of a printer driver. Furthermore, the printing system of the present invention does not render even journaled print data to the print server, unlike many printing systems discussed above. Still further, the printing system of the present invention does not require the printing device to be continuously polled, as synchronized management within the printing system using print job tickets is uniquely provided for. Each of these concepts is explained in greater detail below.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 3 through 15, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The following disclosure of the present invention is grouped into two subheadings, namely "Exemplary Operating Environment," and "Managing and Processing Print jobs Using Print job tickets." The utilization of the subheadings is for convenience of the reader only and is not to be construed as limiting in any sense.

Exemplary Operating Environment

Figure 1:
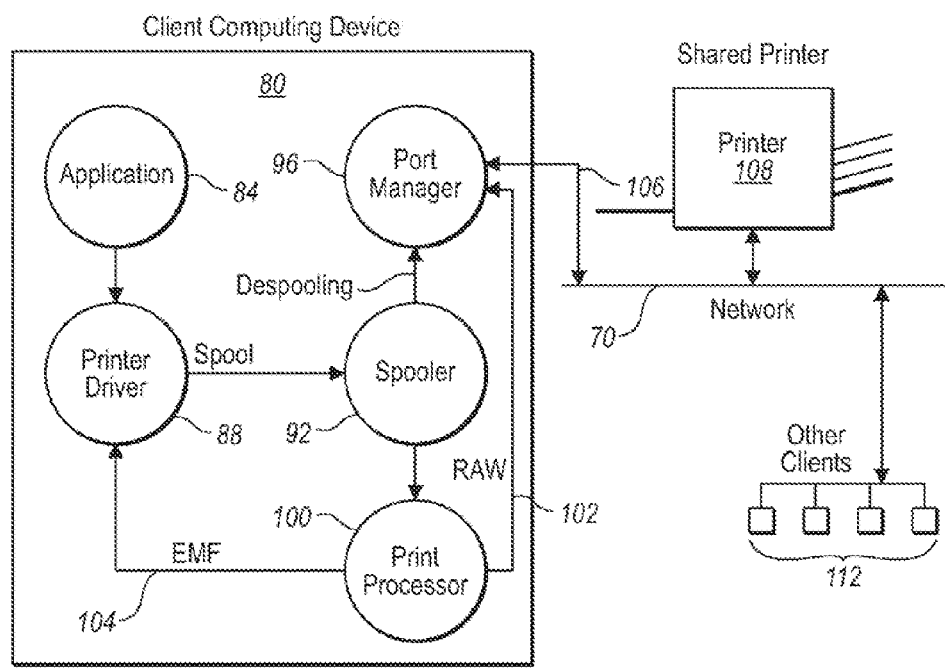
FIG. 1 illustrates a prior art traditional printing system in which one or more client computing devices share a printing device.
Figure 2:
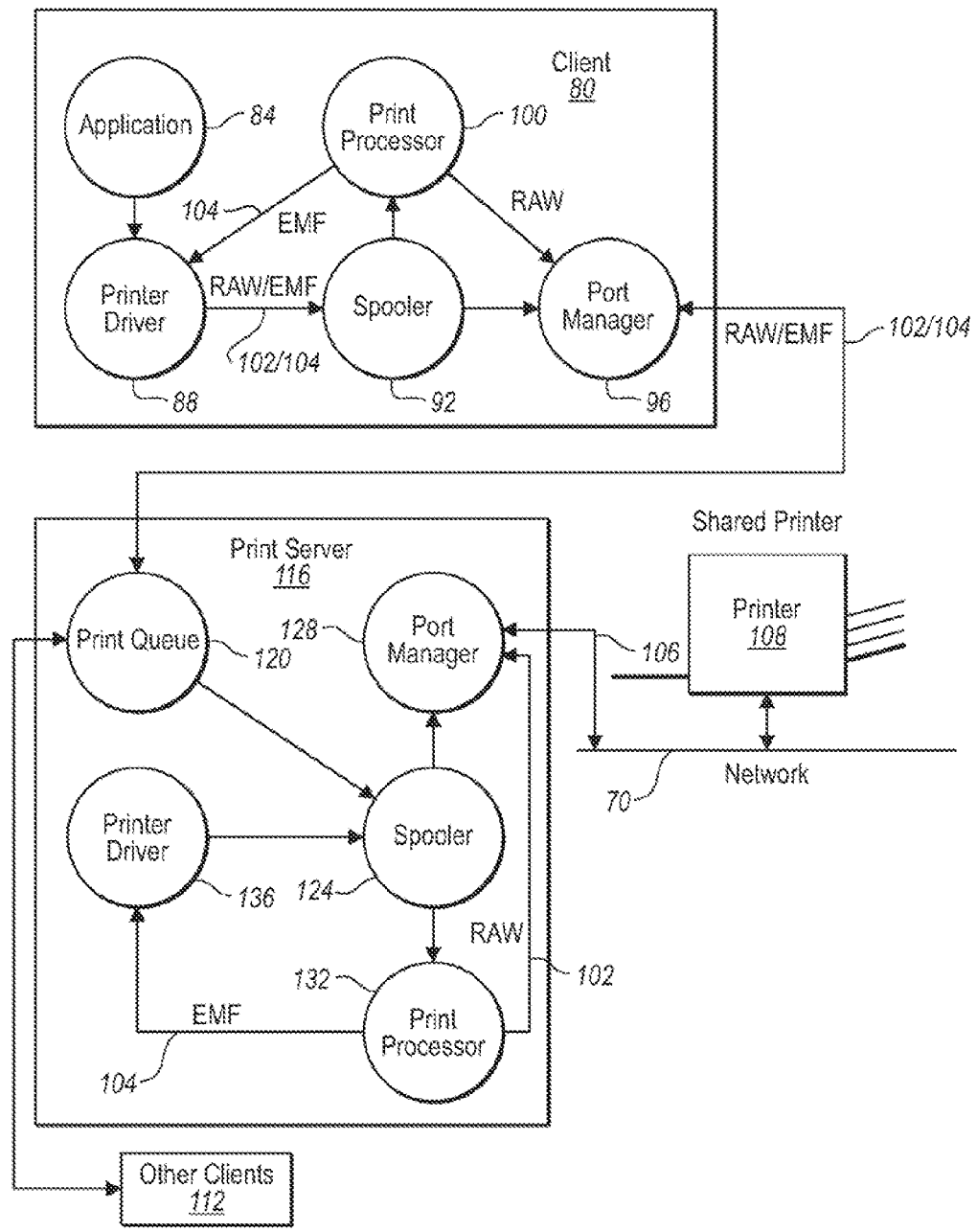
FIG. 2 illustrates a prior art traditional printing system in which a print server is utilized to control the print jobs of one or more connected client computing devices intended for a shared printing device.
Figure 3:
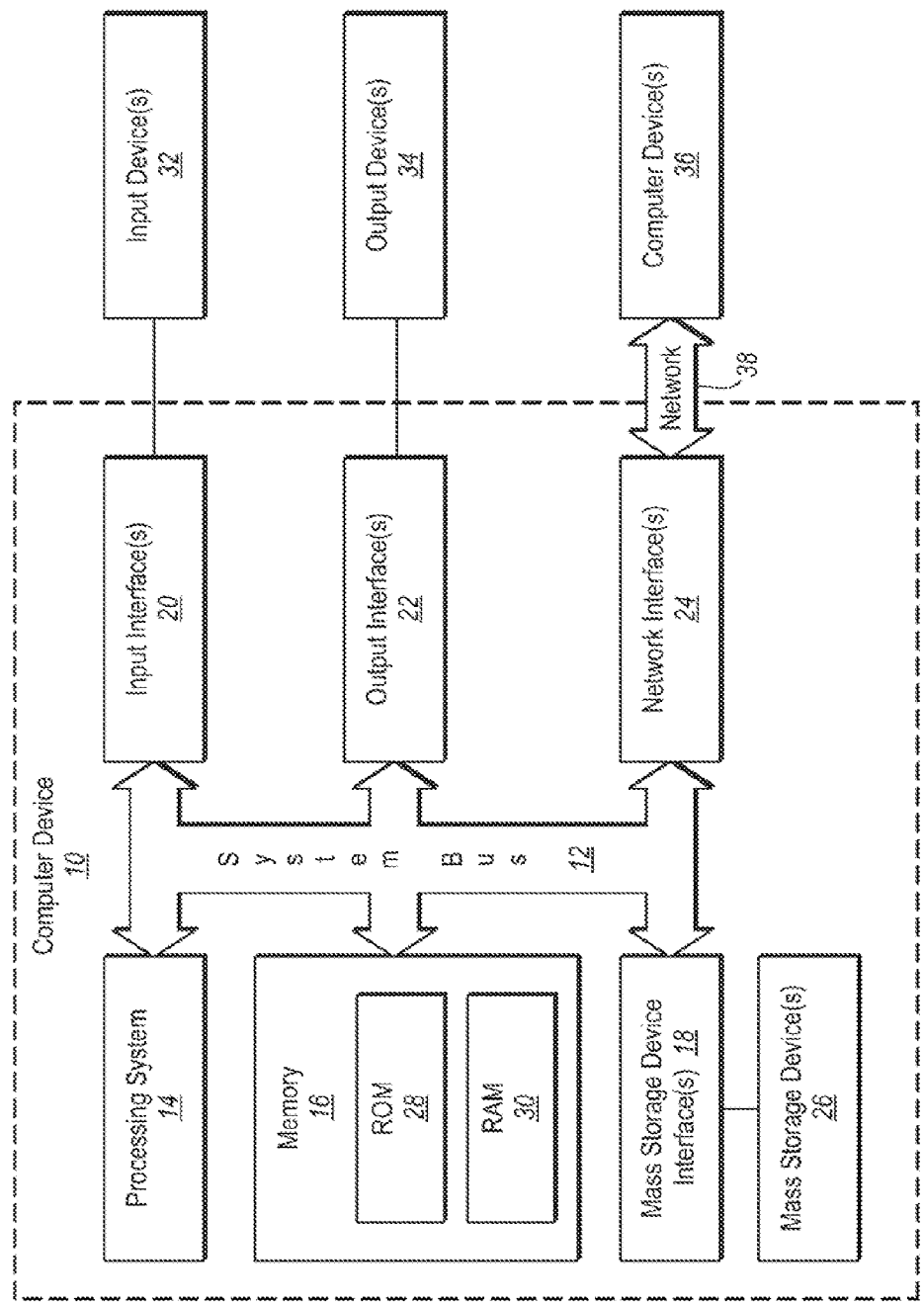
FIG. 3 illustrates a general description of a suitable operating environment in which the invention may be implemented.
Figure 4:
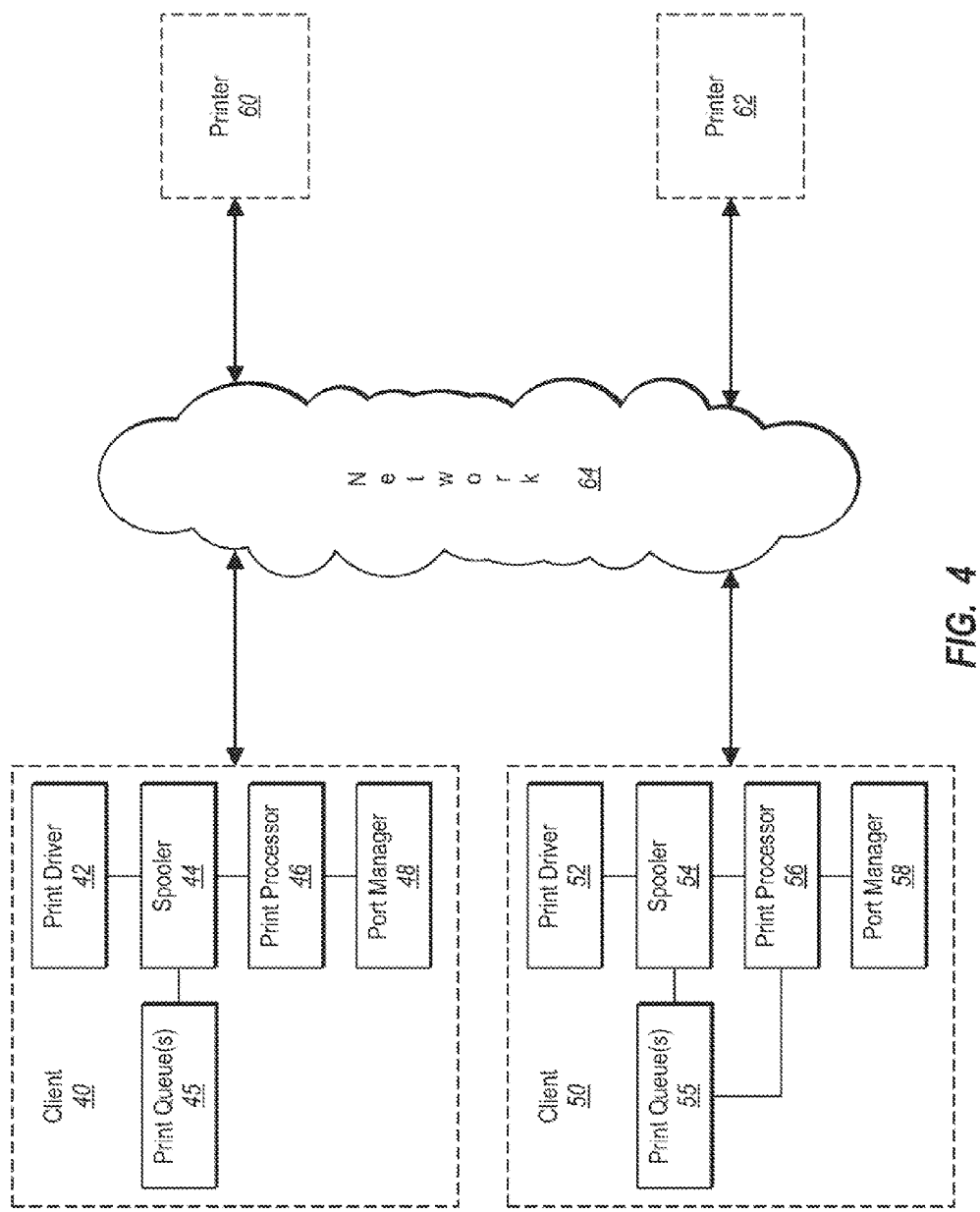
FIG. 4 also illustrates a general description of a suitable operating environment in which the invention may be implemented in a networked environment that includes two clients and two printers connected via a network.

FIGS. 3 and 4 and the corresponding discussion are intended to provide a general description of a suitable operating environment in which the invention may be implemented. One skilled in the art will appreciate that the invention may be practiced by a variety of computing devices and in a variety of system configurations, including in a networked configuration, as will be further explained below.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 3, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

While those skilled in the art will appreciate that the invention may be practiced in networked computing environments with many types of computer system configurations, FIG. 4 represents an embodiment of the present invention in a networked environment that includes two clients and two printers connected via a network. While FIG. 4 illustrates an embodiment that includes two clients connected to the network, alternative embodiments include one client connected to a network or many clients connected to a network. Similarly, embodiments of the present invention include one printer connected to the network or more than two printers connected to the network.

The representative system illustrated in FIG. 4 for managing and processing print jobs in a networked environment includes a variety of computer devices, illustrated as clients 40 and 50, and one or more printing devices, illustrated as printers 60 and 62, connected via a network 64, which may include one or more local area networks ("LANs") and/or one or more wide area networks ("WANs"). While printers 60 and 62 are illustrated as individual printers, an embodiment of the present invention embraces printer 60 or printer 62 as a cluster of printers that act as a single logical printing device as well as a single physical printing device.

Client 40 is a computing device that includes print driver 42, spooler 44, print queue(s) 45, print processor 46, and port manager 48. Similarly, client 50 is a computing device that includes print driver 52, spooler 54, print queue(s) 55, print processor 56, and port manager 58. Client computing devices 40 and 50 are configured to manage print jobs initiated locally or remotely by other clients, as will be further discussed below.

Clients 40 and 50 keep one or more queues of spooled print jobs per accessible printing device. As an example, in the Microsoft® family of operating systems, spool data (<job>.spl) and spool header or shadow (.shd) files are kept in a spool directory (e.g., C:\windows\spool\printers; or C:\winnt\system32\spool\printers) until despooled to the port manager(s) associated with the printing device(s), where <job> is the job identification associated with the print job. A client-based queue may be implemented by adding a third file to the spool directory to contain information about the print job to schedule and despool the print job at a later instant in time. By way of example, the information may include the DNS name of the printing device(s), the IP address of the printing device(s), the name of the document(s)/file(s) that are to be printed, the owner of the print job, a submission time of the print job, the size of the spool data, the number of pages in the print job, the number of sheets in the print job, the user, and/or an assigned priority for the print job.

An additional file may be kept in the spool directory, the registry, or in another location on disk or in memory that maintains an ordered list of spooled print jobs for each printing device. Each entry includes information for identifying the spool data, the header, and the queue information for a print job. In the Microsoft® family of operating systems, this information may be the file base name of the spool data file containing the print job identification. The position of each entry represents the current scheduled order for despooling among other spooled print jobs on the same print queue. Subsequent processing by a spooler, a print processor, or another application or background process may change the scheduling of existing spooled print jobs by changing the order of the corresponding entries in the file.

While the discussion above relates to the use of a Microsoft® operating system, other embodiments of the present invention embrace the use of other operating systems, such as an Apple Macintosh® operating system, a Linux® operating system, a System V Unix® operating system, a BSD Unix® operating system, an OSF Unix® operating system, an IBM® Mainframe MVS operating system, and/or another operating system.

The present invention describes a computerized printing system with spooler based or print processor based direct despooling of a print job to a shared printing device with synchronous centralized management, using print job tickets, and method for performing the same. Specifically, the present invention features a computer based printing system, comprised of a client computing device, optionally a server computing device, one or more printer drivers, a print processor, print spooler, and one or more printers, means for initiating a print job(s), all or in part, or one or more copies of, a document(s), in a local, network or remote, single or multi-user, printing environment, and a means to despool print data directly to a printing device using print job tickets, which are discussed in greater detail below.

The printing system comprises one or more shared printing devices, or printers, which are integrally inter-connected in either a network or peer-to-peer printing environment. Connected to the printing device(s) are one or more printing sources, such as a client computing device or a server computing device, that is capable of initiating print jobs of one or more documents, capable of spooling a print job to a spooler, and capable of despooling a print job directly to the printing device(s). The printing system further comprises a print server capable of managing one or more print jobs existing on the shared printing devices, wherein the printing source(s) send a print job ticket to the print server. Upon receiving the print job ticket, the print server maintains a print queue of print job requests, wherein it authorizes the despooling of the print job(s) from the printing source(s), and also manages the progress and state of the print jobs in a centralized and synchronized manner.

Initially, the user the initiates print job(s) from an application, or by an automated or background process supported on the printing source. A print job typically comprises one or more documents, all or in part, each comprising one or more pages, and collectively consisting of one or more copies. Upon initiation of the print job(s), the user selects a command, or sequence of commands, and/or stimulus from the printing source or client computing device, that the user intends to despool the print data to a printing device(s).

After initiation of the Print job(s), either from the printing source or from the printing device, the application, or other process, writes the print instructions to a printer driver. The print instructions may be rendered into printer ready data (i.e., RAW), or journaled for deferred or delayed rendering (e.g., EMF). For example, in the Microsoft family of Operating Systems, the print instructions would be written to the graphical display interface (i.e., GDI) with the device context(s) of the printing device(s). These print instructions would then get passed to the corresponding printer driver(s). In the case of journaled data, the printer driver would save the print instructions and device context in an Enhanced Metafile Format (i.e., EMF). The printer driver would then spool the journaled data to the spooler. In the case of RAW data, the printer driver would render the print instructions and device context into printer ready data (e.g., PCL, Postscript, PDF, rastetrized). The printer driver would then spool the printer ready data to the spooler.

Generally, spooling, an acronym for simultaneous peripheral operations on-line, refers to putting jobs in a buffer, which is a special area in memory or on a disk where a device can access the information stored therein when it is ready. Spooling is useful because devices access data at different rates. The buffer provides a waiting station where data can rest while the slower device catches up. Typically, in print spooling, documents are loaded into the buffer (usually an area on a disk), and then the printer pulls them off the buffer at its own rate. Because the documents are in a buffer where they can be accessed by the printer, you can perform other operations on the computer while the printing takes place in the background. Spooling also lets you place a number of print jobs on a queue instead of waiting for each one to finish before specifying the next one. Furthermore, a server is a computer or device on a network that manages network resources. In the case of a print server, the print server is a computer that manages one or more printers. Servers are often dedicated, meaning that they perform no other tasks besides their server tasks. On multiprocessing operating systems, however, a single computer can execute several programs at once. A server in this case could refer to the program that is managing resources rather than the entire computer. Furthermore, a printer driver is a software program that controls a printer. Whenever a document is printed, the printer driver takes over, feeding data to the printer with the correct control commands. Most modern operating systems come with printer drivers for the most common types of printers, but they must be installed before the printer can be used.

In the present invention, initiation of the print job existing on the client computing device may be via the printing source or the printing device. Also, the construction and operation of the print job tickets of the present invention printing system may be controlled by the spooler on the printer server or through a print processor or print assistant or any process added to the standard print model between the driver and port. Each of these concepts and embodiments are discussed in detail below.

Printing Source Initiation of Print Job—Spooler Based

Figure 5:
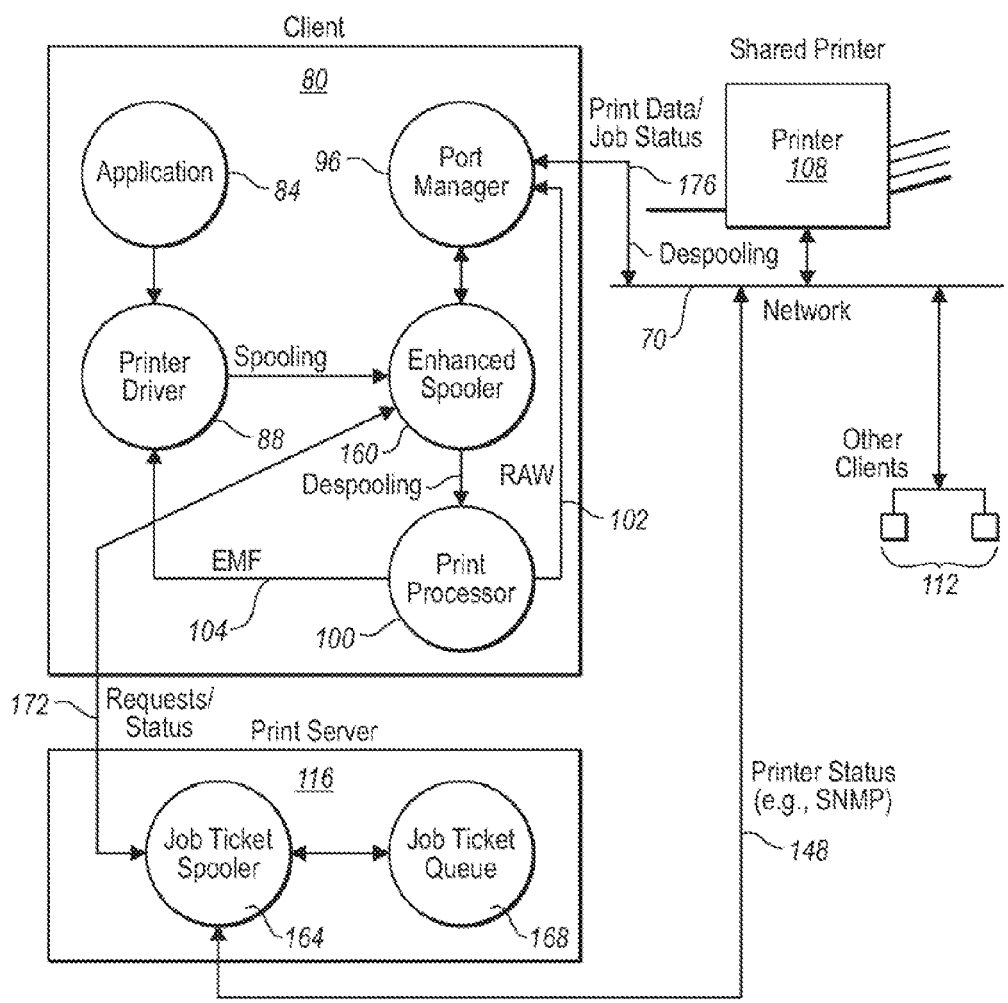
FIG. 5 illustrates a spooler-based embodiment of the printing source initiated printing system.
Figure 6:
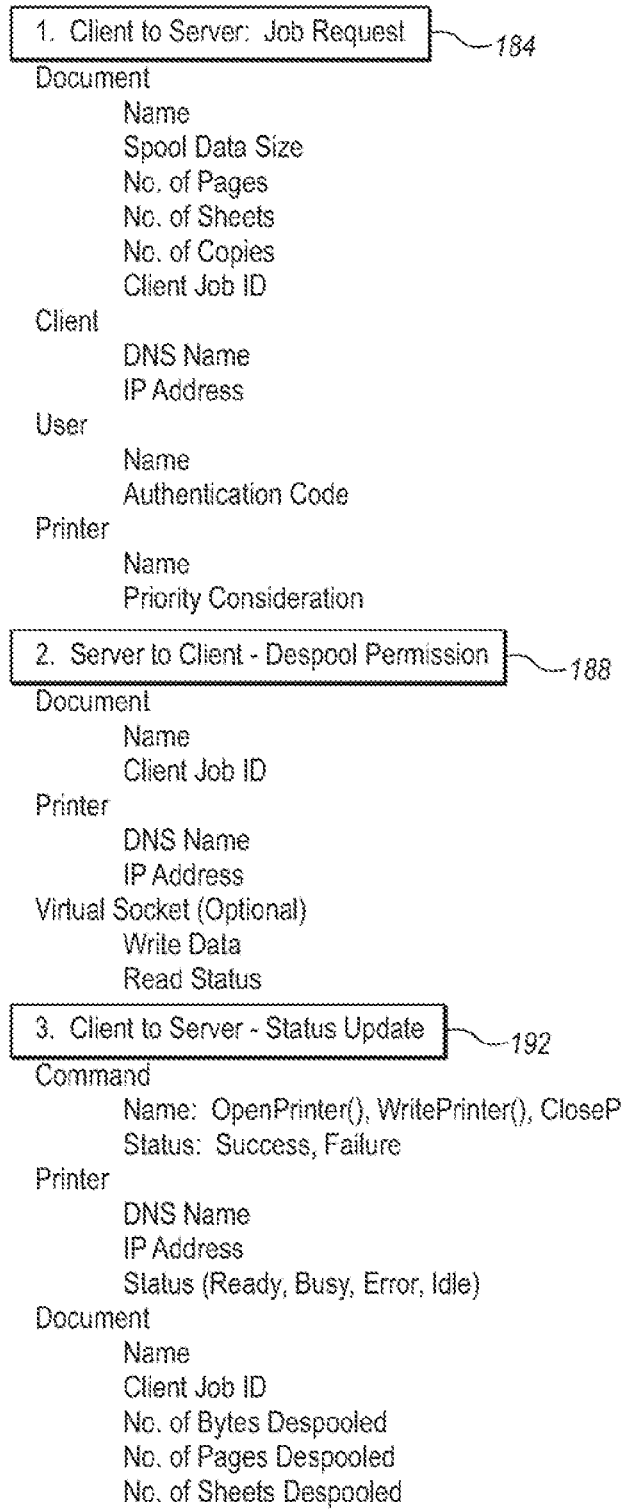
FIG. 6 illustrates a flow diagram of direct client-server communication within a normal print cycle.

Referring to FIGS. 5 and 6, in this embodiment, local spooler 160 is an enhanced spooler that constructs a print job ticket of the print job requirements from the spool data. In the case of rendered or journaled data, typically the spool data starts with a spool header describing spooling needs and resources, followed by a print job header specifying the requirements of the print job, such as in PJL (Print job Language) or PCL (Printer Control Language), or DEVMODE (i.e., EMF). Local spooler 160 sends the print job ticket to print server 1 16 (shown in FIG. 6 as 184) to be queued for printing device 108. The print job ticket may comprise, but is not limited to document information, such as the name of the document, size of the spool data, number of pages in the print job, number of sheets in the print job, number of copies in the print job, and local (e.g. client) spooler assigned print job identification, etc.; client information, such as the name of the client (e.g. DNS name), and network address of client (e.g. IP address); user information, such as the name of the user, departmental of other group name; authentication code, etc.; and printing device information, such as the name of the printer, or any existing priority considerations.

The printer server spooler 164, or job ticket spooler, referred to hereafter as job ticket spooler 164, maintains print job tickets in one or more job ticket print queues 168 from multiple printing sources for one or more shared printing device(s) 108. Print server spooler 164 authorizes the despooling of print data to printing device(s) 108 by removing the associated print job ticket from the job ticket print queue 168 by some algorithm, such as FIFO, or by size/aging, and may consider priority considerations from the printing source 80.

When job ticket spooler 164 selects a print job ticket for printing, job ticket spooler 164 sends a message to printing source 80 specified in the print job ticket, authorizing the despooling of print data 176 over network 70 directly to printing device 108 (shown in FIG. 6 as 188). The print job authorization may comprise, but is not limited to document information, such as the name of the document(s), and local spooler's 160 assigned print job identification; printing device 108 information, such as the name of printing device 108, network address of printing device 108 (e.g., DNS name); and connection information, such as write print data, read status; etc.

In this preferred embodiment, printer server 116, and particularly job ticket spooler 164, establishes an exclusive open connection 148 for reading and writing to/from printing device 108 (i.e., virtual circuit), such as a socket with a separate send( ) and listen( ) connection. Job ticket spooler 164 passes a copy of the connection to printing source 80. In an alternate embodiment, printing source 80 establishes the exclusive open connection(s) to printing device(s) 108.

Upon receipt of authorization, and possibly after some delay, or predetermined time, printing source 80 initiates despooling of the print data 176 directly to printing device(s) 108. Printing source 80 despools the print data over network 70, typically in fixed size partitions, to printing device(s) 108 via writing to the send( ) portion of the established open connection.

Upon completion of receipt of each partition of print data, printing device 108 responds with a completion status or a status update on the listen( ) portion of the open connection to printing source 80, wherein printing source 80 then sends a message to the printer server on the status of this operation (shown in FIG. 6 as 192). This information may comprise, but is not limited to command information, such as open printing device, write to printing device, close printing device; printer information, such as DNS name, IP address, status (ready, busy, error, idle, etc.); and/or document information, such as name of the document, client job identification, number of bytes despooled, number of pages despooled, number of sheets despooled, etc. In the case of the preferred embodiment, each of the spoolers, 160 and 164, respectively, on printing source 80 and print server 116 share copies of the listen( ) portion of the connection and simultaneously receive the completion status from printing source 80. In the alternative embodiment, printing source 80 maintains a second open connection with print server 116 and echoes the completion status from printing source 80 to print server 116.

Upon completion of despooling the print data, printing source 80 sends a print job completion command to printing device 108. Upon receipt of completion from printing device 108, or echo, printing source 80 and print server 116 close their copies of the connection.

This synchronized manner of sending/receiving completion notices and/or status updates allows print server 116 to maintain progress and completion of despooling the print job to printing device 108.

During despooling or printing of the print job, several things can go wrong, such as the printing device enters an offline or error state, or is unresponsive; the printing source is unresponsive; the communication link between the print server and the printing device is down; and/or the communication between the print server and the printing source is down.

To maintain synchronization, the management of the print jobs must be protected from these conditions. In reference to FIG. 7, after authorizing a print job ticket, and prior to the print job completion response from the printing device, the print server may perform a status request 196 to periodically verify that the printing source is communicating properly. To maintain a low traffic volume, job ticket spooler 164 may use a variety of algorithms to guess and/or adjust an optimal interval, using such factors as printer speed (PPM), RIP or pre-RIP, spool data size, and/or response intervals to date.

After the calculated period has elapsed, if no completion notification of the print job or despooling of a partition of print data has been received, the job ticket spooler sends a status request 196 to the printing source. This request may comprise, but is not limited to printer information, such as the name of the printing device (e.g., DNS Name), and network address of printer(s) (e.g., IP address); server information, such as name of the server, network address of the server, or name of the print queue (e.g., \\server\\printer); document information, such as the name of the document, or the local spooler's assigned print job identification.

Whenever the printing source does not respond within a specified time interval, the job ticket spooler considers the printing source to be non-communicating. The job ticket spooler then attempts to determine the progress of the print job by sending a status request message 200 to the printing device to respond with the printing device's current job progress/status. The response 204 from the printing device may comprise, but is not limited to, printer information, such as the name of the printer (e.g., DNS Name), network address of the printing device (e.g., IP Address), the status of the printing device (e.g. idle, ready to print, busy, error, offline); and print job information, such as the number of print jobs spooled, current print jobs (including name of client, network address, or local spooler job identification), or the last print job completed (including name of the client, network address, or local spooler job identification).

The job ticket spooler updates the status of the print job, as appropriate. The job ticket spooler continues to request status updates on a specified time period from the printing device, until the status indicates the print job has completed, or communication is re-established with the printing source.

If the printing device is unresponsive as well, the job ticket spooler considers the printing device to be non-communicating. The job ticket spooler does not update the status of the print job until the job ticket spooler is able to re-establish communication with either the printing source or printing device.

The print server and printing source, such as client computing device, each have authority to suspend, resume or delete a print job, as an alternative means for dealing with an unresponsive, or other error state. If the printing device is unresponsive for an extended period of time, the job ticket spooler may send a request to the printing source to suspend, resume or delete the print job (shown as 208, 212, and 216). Likewise, the printing source may send a request 220, 221, 222 to the job ticket spooler either to suspend, resume, or delete the print job. If suspended, and communication is re-established, the printing source or print server may request the other to resume the print job. Moreover, the printing source may communicate to the server, shown as 224, to change print jobs as necessary.

Figure 8:
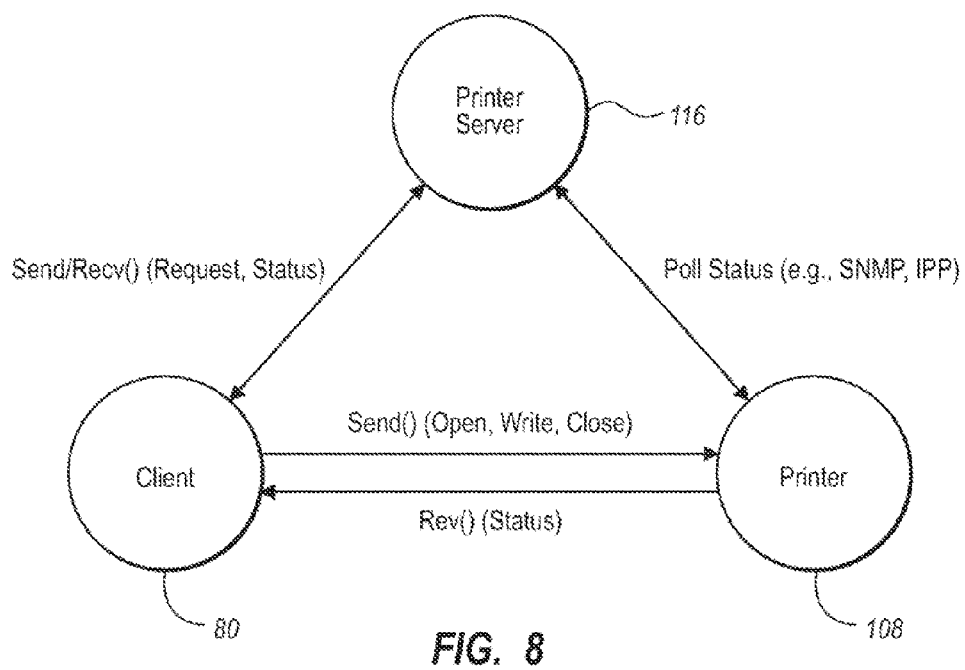
FIG. 8 illustrates the direct communication between a client, server, and printing device—non-virtual socket.

FIG. 8 illustrates the three-way printing source/server/printing device communication using a non-virtual socket concept. Print server 116 is able to communicate with printing source 80 using send/receive commands. In addition, print server 116 is able to communicate with printing device 108 by polling printing device 108 and subsequently receiving its operational status as described above. Printing source 80 communicates with printing device 108 by sending print job commands (open, write, close) and receiving the status of printing device 108 as updated. Printing source 80 directly despools print data to printing device 108 once the proper conditions have been satisfied and authorized to do so.

Figure 9:
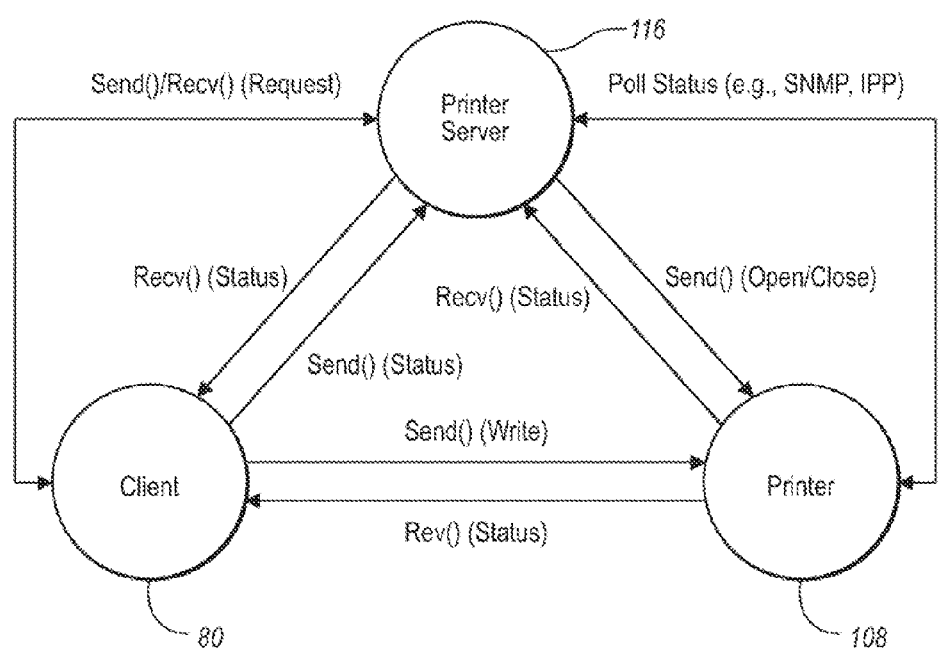
FIG. 9 illustrates the direct communication between a client, server, and printing device—virtual socket.

FIG. 9 illustrates the three-way printing source/server/printing device communication using a virtual socket concept. This concept is similar to the non-virtual concept, except that print server 116 operates to send open/close commands to printing device 108 as opposed to printing source 80. In addition, print server 116 sends a receive status command to printing source 80, which in turn, sends back a status update to print server 116. Still further, although the open/close command is sent to printing device 108 from print server 116, printing source 80 still sends the write command to printing device 108, thus maintaining the direct spooling of print data from printing source 80 to printing device 108.

Figure 7:
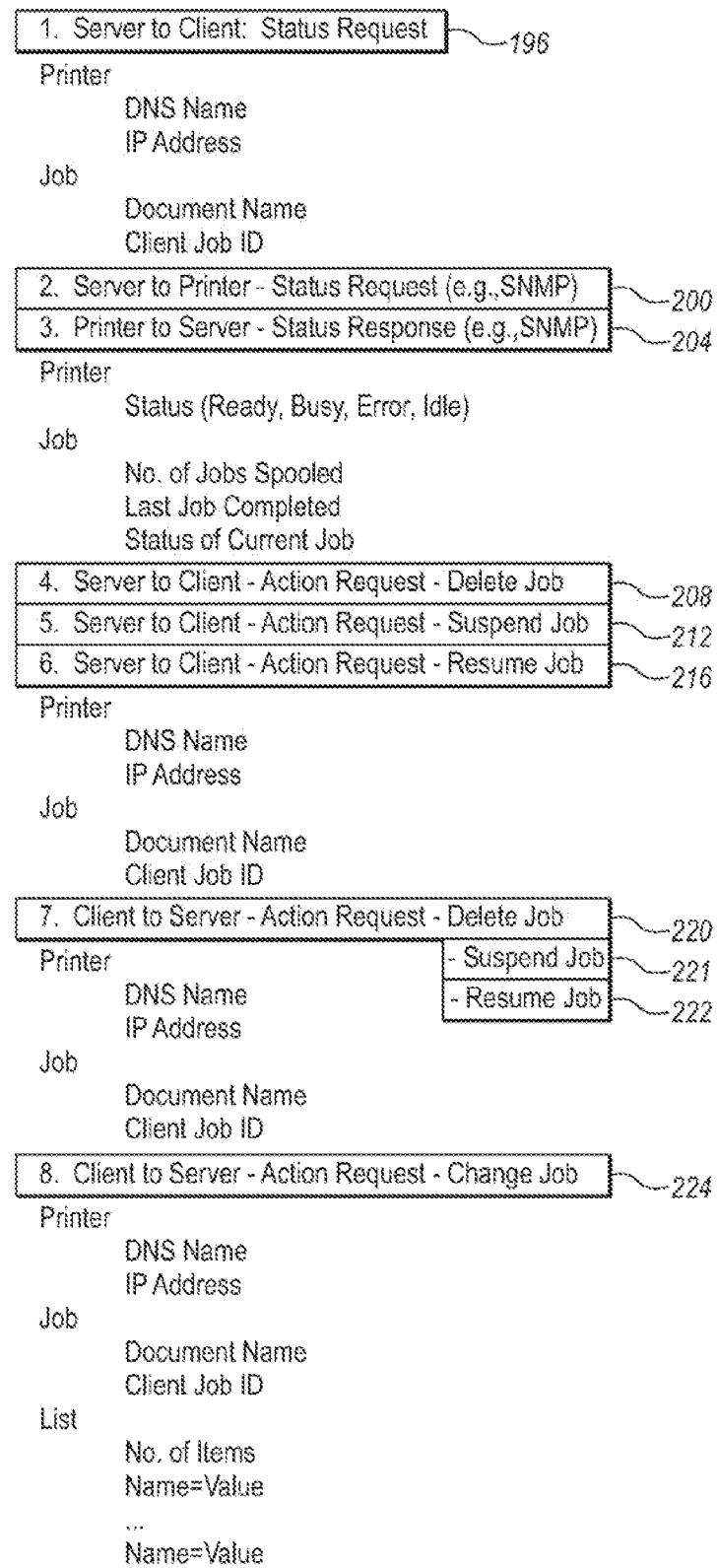
FIG. 7 illustrates a flow diagram of direct client-server communication during an interrupted or lost print cycle.
Figure 10:
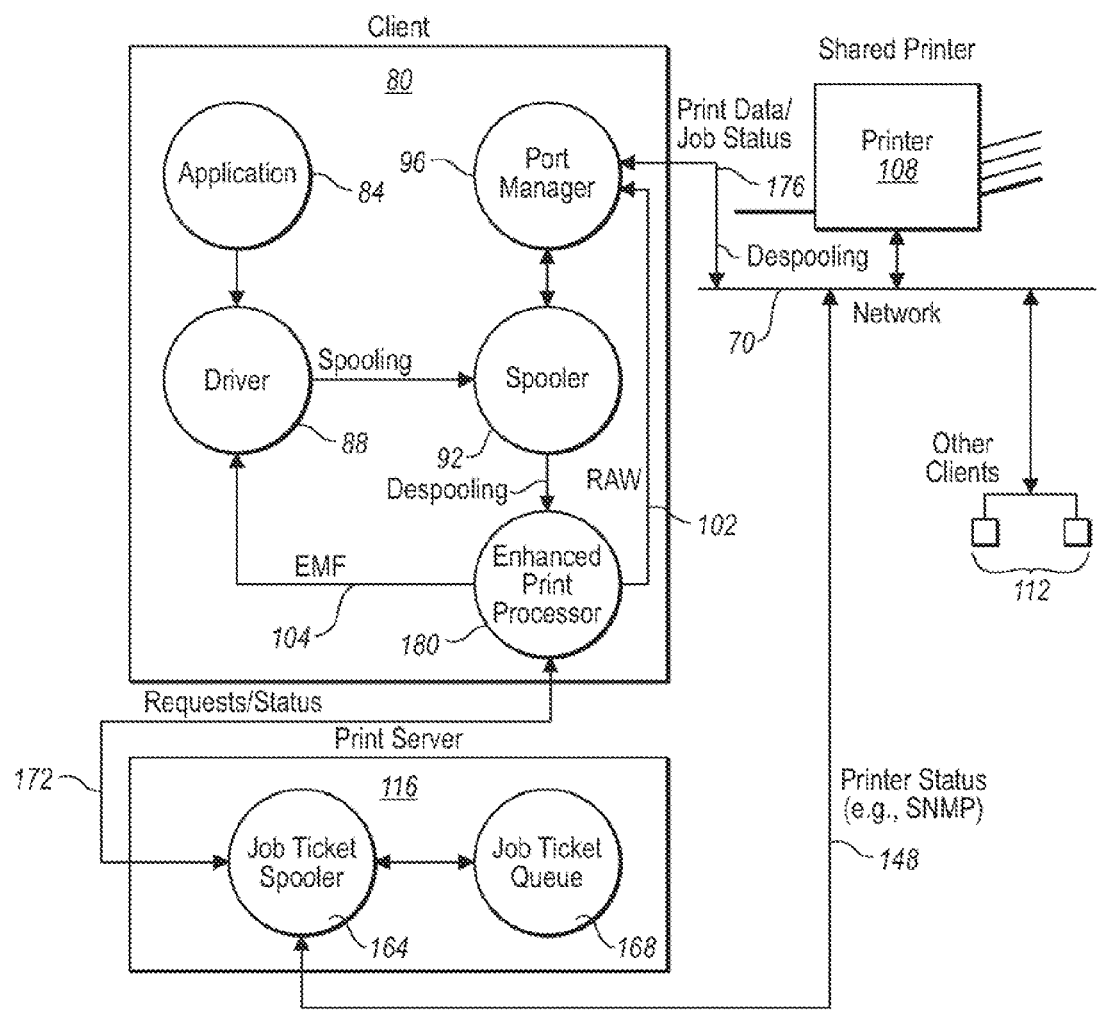
FIG. 10 illustrates a print processor based embodiment of the printing source initiated printing system.

Printing Source Initiation of Print Job—Print Processor/Print Assistant Based FIG. 10 illustrates an alternative embodiment of the above described system and method. Specifically, FIG. 7 illustrates a print processor or print assistant based, rather than a spooler based, print server initiated printing system. In other words, the printing source initiation of a print job according to the present invention is made operational through the use of an enhanced print processor or print assistant (shown as print processor 180). All other processes and systems described above (as shown in FIGS. 6–9) are the same in this embodiment, only carried out by print processor 180 (or print assistant) instead of spooler 160. As such, a detailed explanation of this embodiment is thought unnecessary as one ordinarily skilled in the art will be able to recognize and understand the principles and concepts of this embodiment in light of that shown in FIGS. 5–9, and the explanation accompanying these figures.

Printing Device Initiation of Print Job—Spooler Based

Figure 11:
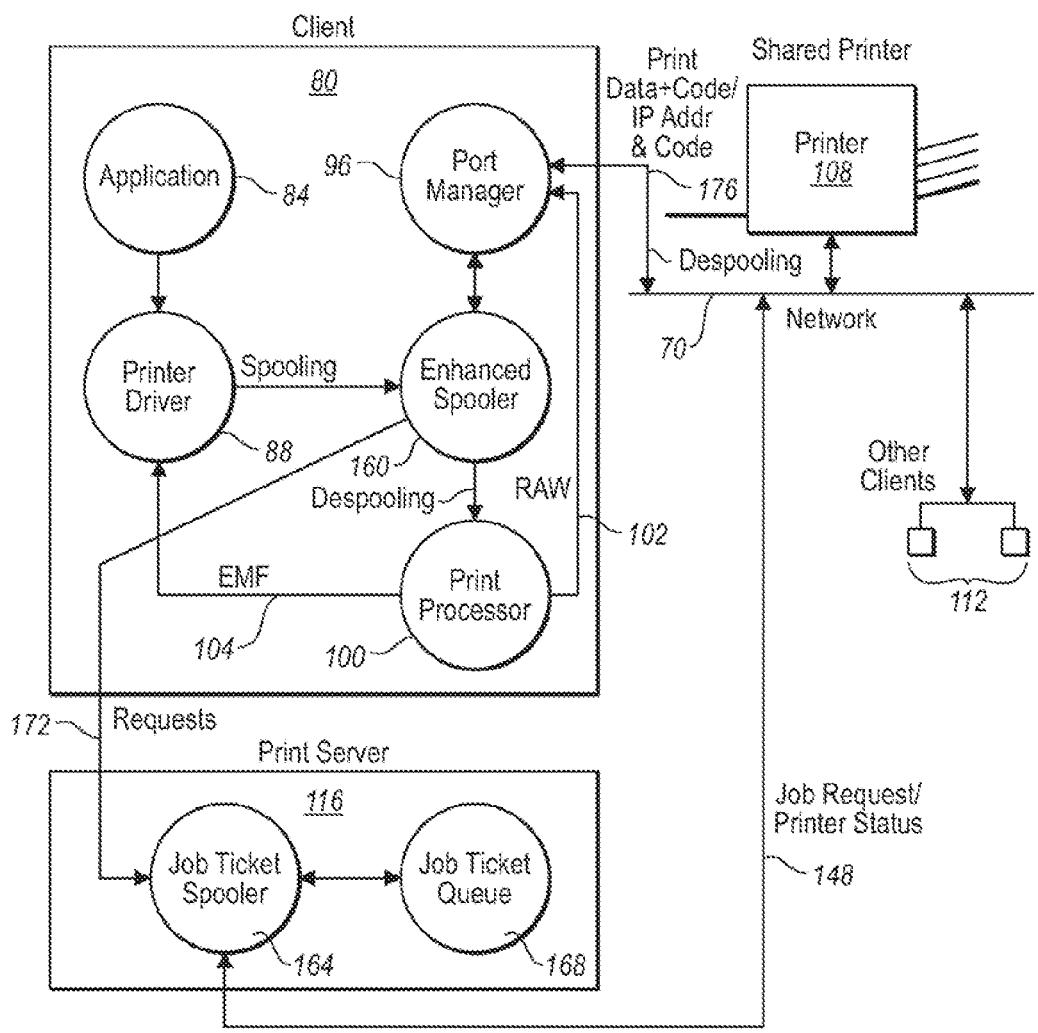
FIG. 11 illustrates a spooler-based embodiment of the printing device initiated printing system of the present invention.

Referring to FIG. 11, in this embodiment, local spooler, shown as enhanced spooler 160, constructs a print job ticket of the print job requirements from the spool data. In the case of rendered or journaled data, typically the spool data starts with a spool header describing spooling needs and resources, followed by a print job header specifying the requirements of the print job, such as in PJL (Print job Language) or PCL (Printer Control Language), or DEVMODE (i.e., EMF). Enhanced spooler 160 sends the print job ticket to print server 116 to be queued for the printing device. The contents of the print job ticket would contain the information as was described earlier.

Print server 116 comprises job ticket spooler 164 and job ticket queue 168. Job ticket spooler 164 maintains each of the print job tickets in one or more job ticket queues 168 from multiple printing sources 80 for one or more shared printing device(s) 108. Job ticket spooler 164 authorizes the despooling of print data to printing device(s) 108 by removing the associated print job ticket from job ticket print queue 168 by some algorithm, such as FIFO, or by size/aging, and may consider priority considerations from printing source 80.

When job ticket spooler 164 selects a print job ticket for printing, job ticket spooler 164 sends a message to printing device 108 specified in the print job ticket, authorizing the despooling of print data 176 from printing source 80. The print job authorization comprises, but is not limited to document information, such as name of documents, and/or local spooler's 160 assigned print job identification; printing source 80 information, such as the name of the printing source (e.g., DNS Name), and/or network address of printing source 80 (e.g., IP Address); connection information, such as write print data, and/or read status.

In the preferred embodiment of this concept, job ticket spooler 164 establishes an exclusive open connection for reading and writing to/from printing device 108 (i.e., virtual circuit), such as a socket with a separate send( ) and listen( ) connection. Printing device 108 passes a copy of the connection to printing source 80. In an alternate embodiment, printing source 80 establishes the exclusive open connection(s) to printing device(s) 108.

Upon receipt of authorization, and possibly after some delay, or predetermined time, printing device 108 initiates the despooling of print data 176 directly from printing source 80 (i.e., pulls the print job), by sending a despool authorization message to printing source 80. The print job authorization comprises, but is not limited to document information, such as the name of the document, and/or the local spooler's 160 assigned print job identification; and printing device 108 information, such as the name of printing device 108 (e.g. DNS name), and/or the network address of printing device 108 (e.g., IP Address).

Upon receipt of authorization, and possible after some delay, or predetermined time, printing source 80 despools print data 176, typically in fixed size partitions, to printing device 108 via writing to the send( ) portion of the open connection. Upon completion of receipt of each partition of print data, printing device 108 responds with a completion status on the listen( ) portion of the open connection. In the case of the preferred embodiment, the spoolers on printing source 80 and print server 116, 160 and 164 respectively, share copies of the listen( ) portion of the connection and simultaneously received the completion status from printing device 108. In the alternative embodiment, printing source 80 maintains a second open connection with print server 116 and echoes the completion status from printing device 108 to print server 116.

Upon completion of despooling print data 176, printing source 80 sends a print job completion command to printing device 108. Upon the receipt of completion from printing device 108 or echo, printing source 80 and print server 116 close their copies of the connection.

This synchronized manner of sending/receiving completion notices and/or status updates allows print server 116 to maintain progress and completion of despooling the print job to printing device 108.

Figure 12A:
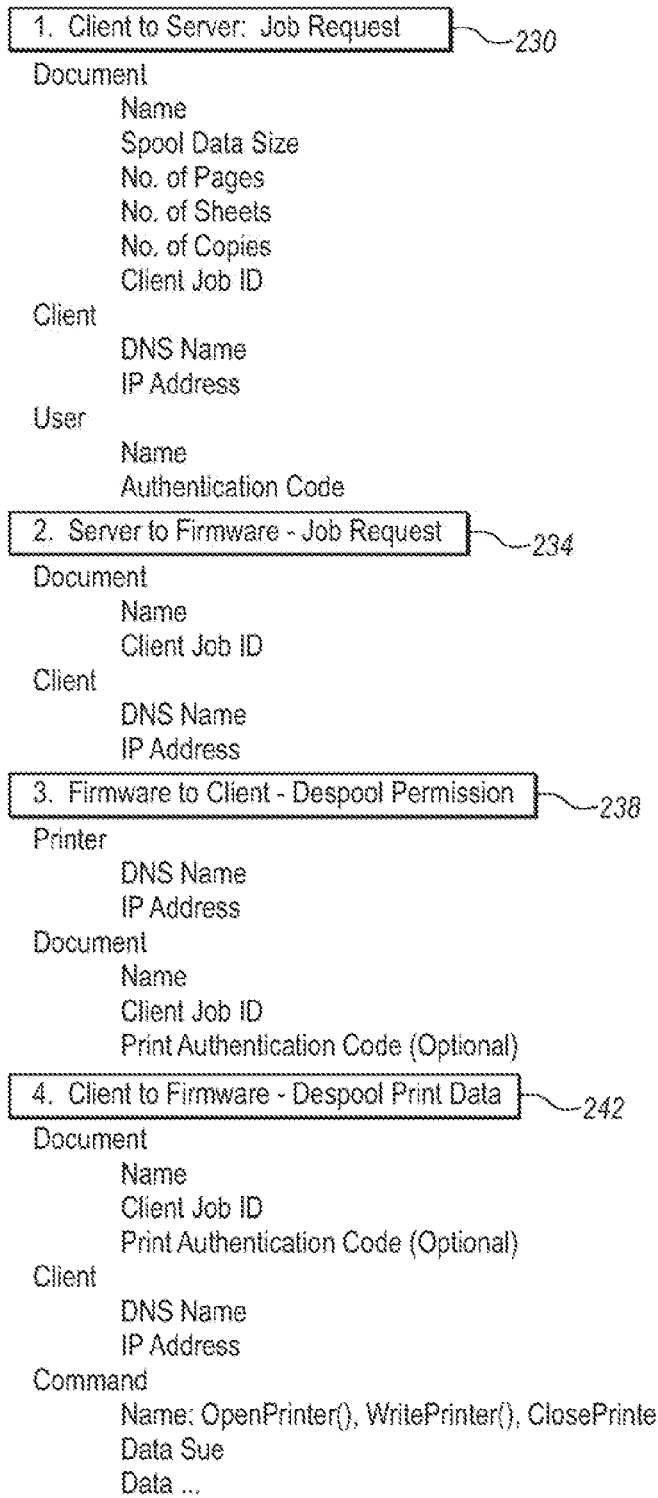
FIG. 12 illustrates a flow diagram of indirect client-server communication within a normal print cycle.

FIG. 12 illustrates a general flow diagram of the process described above. Namely, a printing source communicates with a print server, shown as 230, to initiate a print job request. This request may include information such as document information, printing source information, and/or user information. Once the print server receives the request, it communicates a similar print job request 234 to one or more of the printing device(s) within the network. In this embodiment, the printing device authorizes 238 the despooling of the print data to the printing device, after which the printing source despools the print data 242 directly to the printing device. At any time, the printing device may send status requests to either the printing source or the print server, shown as 246 and 250, respectively, as described above.

Figure 13:
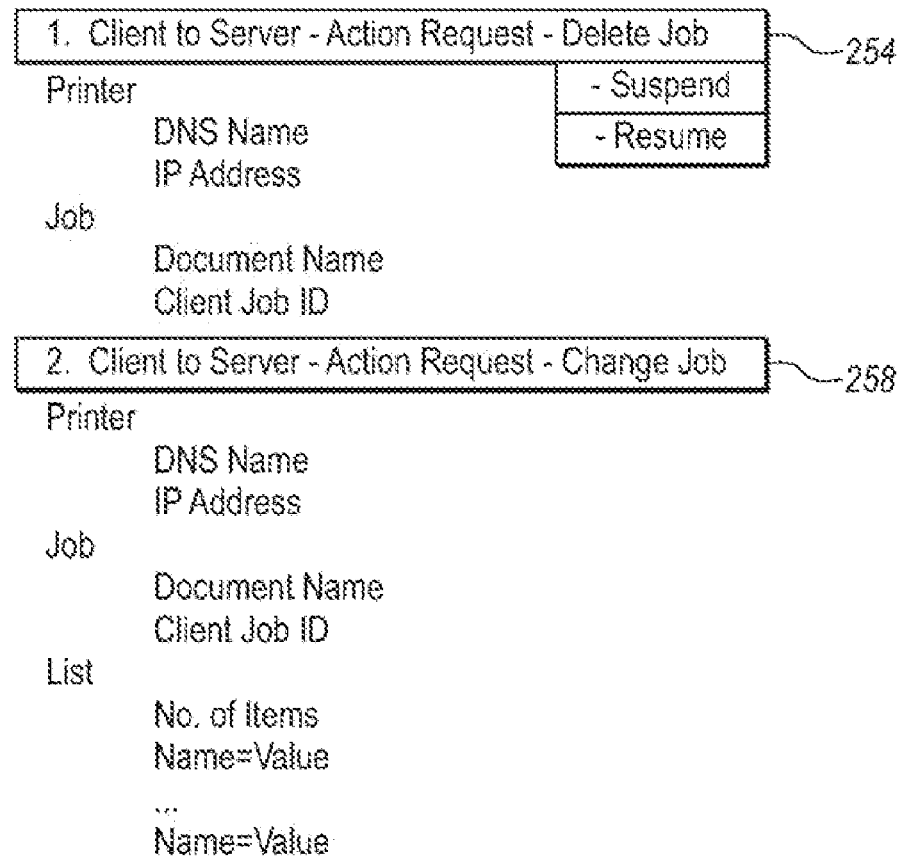
FIG. 13 illustrates a flow diagram of indirect client-server communication during an interrupted or lost print cycle.
Figure 14:
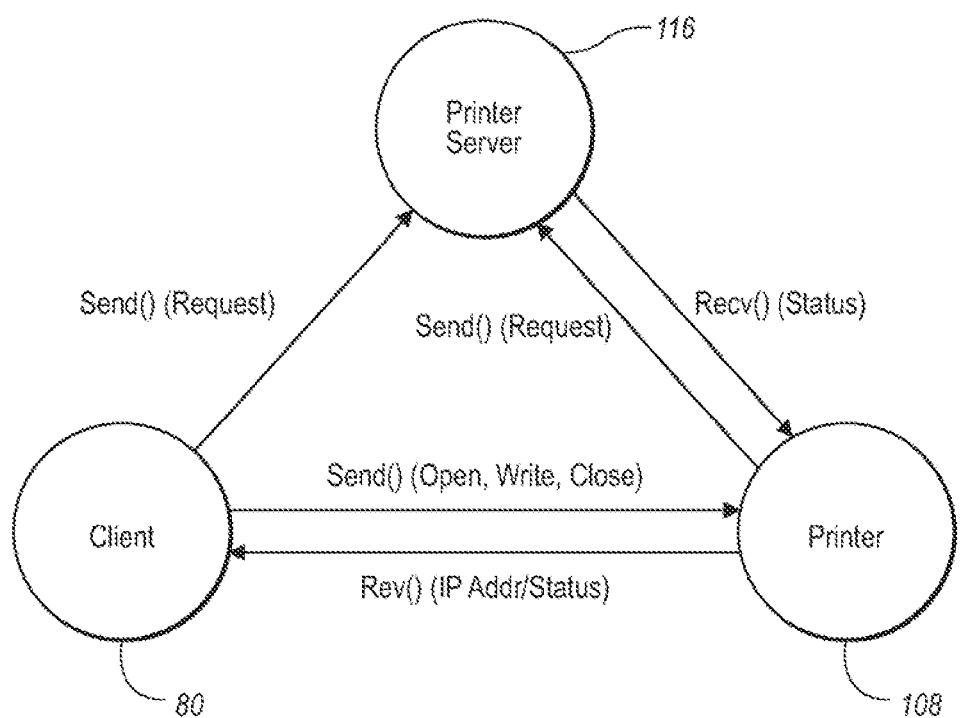
FIG. 14 illustrates the indirect communication between a client, server, and printing device—non-virtual socket.

Referring to FIGS. 13 and 14, just as in the print server initiated printing system, during despooling or printing of the print job/data in the printing source initiated printing system of the present invention, several things can go wrong.

To maintain synchronization, the management of the print jobs must be protected from these conditions. After authorizing a print job ticket and prior to print job completion response from printing device 108, print server 116 may periodically verify that printing source 80 and printing device 108 are communicating. To maintain a low traffic volume, the job ticket spooler may use a variety of algorithms to guess and/or adjust an optimal interval.

After the calculated period has elapsed, if no completion notification of the print job or despool of a partition of print data has been received, the job ticket spooler sends a status request to printing device 108. This request may comprise, but is not limited to document information; client information; and/or server information, such as the name of the server, the network address of the server, and/or the name of the print queue.

Whenever printing device 108 does not respond within a specified time interval, the job ticket spooler considers printing device 108 and printing source 80 to be non-communicating. The job ticket spooler will continuously poll printing device 108 over some interval until communication is re-established. If printing device 108 responds but there is no change in progress over some period of time, the job ticket spooler may consider printing source 80 to be non-communicating.

Print server 116 and printing source 80 each have the authority to suspend, resume or delete a print job, as an alternative means for dealing with an unresponsive, or other error state. If printing device 108 is unresponsive for an extended period of time, printing source 80 may send an action request 254 to the job ticket spooler to either suspend or delete the print job. If printing source 80 is unresponsive for an extended period of time, the job ticket spooler may send a request to printing device 108 to either suspend or delete the print job. If suspended, and communication is re-established, printing source 80 or print server 116 may request print server 116 or printing device 108, respectively, to resume the print job. Moreover, printing source 80 may send an action request 258 to print server 116 instructing it to change print jobs as appropriate.

Printing Device Initiation of Print Job—Print Processor Based

Figure 15:
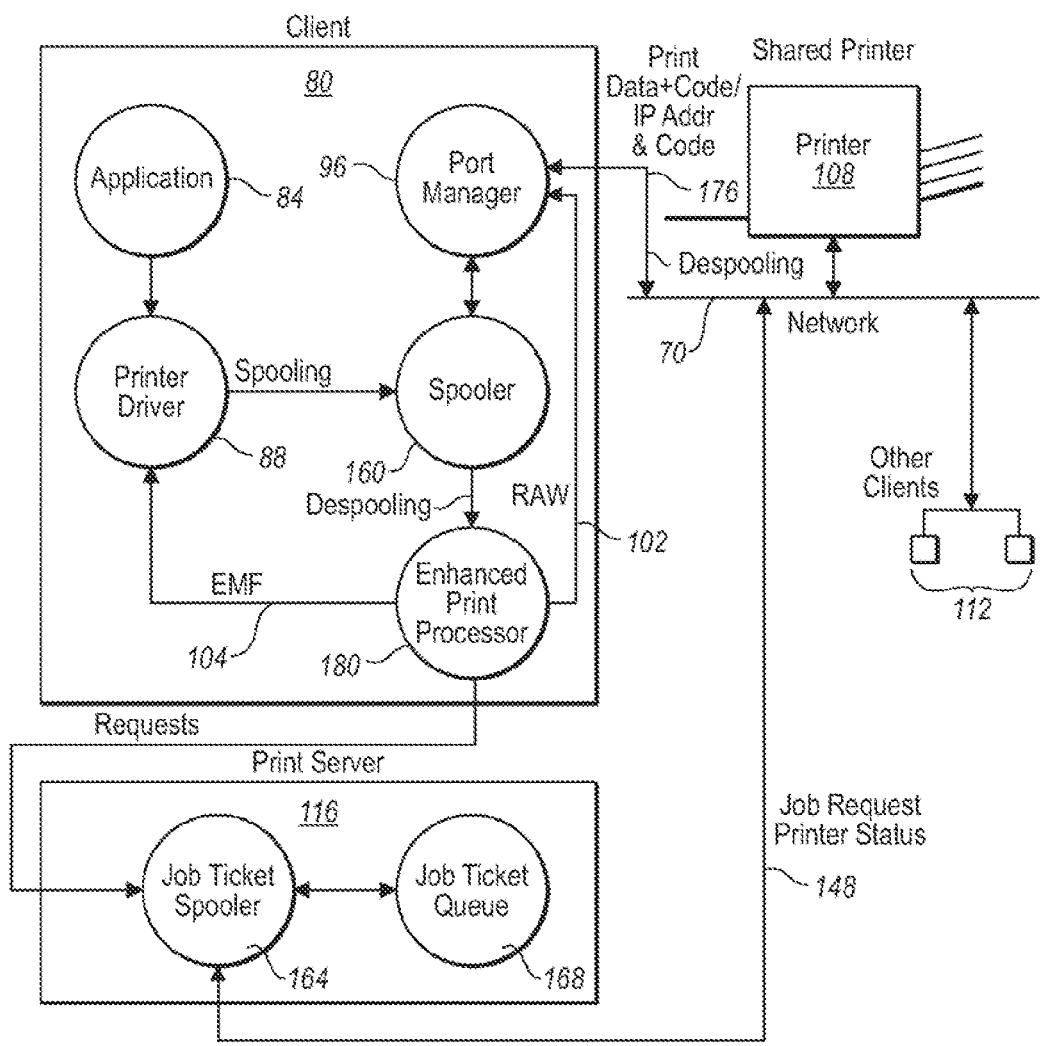
FIG. 15 illustrates a print processor based embodiment of the printing device initiated printing system.

FIG. 15 illustrates an alternative embodiment of the above described system and method. Specifically, FIG. 15 illustrates a print processor or print assistant based, rather than a spooler based, printing device initiated printing system. In other words, the printing device initiation of a print job according to the present invention is made operational through the use of an enhanced print processor or print assistant (shown as print processor 180). All other processes and systems described above (as shown in FIGS. 11–14) are the same in this embodiment, only carried out by enhanced print processor 180 (or print assistant) instead of enhanced spooler 160. It should be noted that various processes or systems (such as a print assistant) may be implemented between the printer driver and the port processor to carry out the intended function described above. As such, a detailed explanation of this embodiment is thought unnecessary as one ordinarily skilled in the art will be able to recognize and understand the principles and concepts of this embodiment in light of that shown in FIGS. 11–15, and the explanation accompanying these figures.

The present invention also features a computer program product for printing a print job, wherein the computer program product comprising code that: directs a local spooler on a printing source to construct a print job ticket from received spool data of the print job, wherein the print job comprises print requirements and print data, and the print job ticket comprises print requirements of the print job; directs the local spooler to send the print job ticket to a job ticket spooler supported on a print server, wherein the job ticket spooler maintains the print job tickets in one or more job ticket queues also supported on the print server; and causes the job ticket spooler to authorize the despooling of the print data directly to a printing device according to the print requirements of the job ticket, wherein the job ticket spooler removes the print job ticket from the job ticket queue. The computer program product further comprises code that directs the printing source to initiate the despooling of the print data to the printing device upon the above mentioned authorization. In addition, the computer program product further comprises code that directs the printing device to initiate the despooling of the print data to the printing device upon the above mentioned authorization. As in the embodiments described and explained above, the job ticket spooler and its functions may be replaced by a print processor or print assist, which is intended to carry out the same functions as the job ticket spooler.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes that come within the meaning and range of equivalency of the claims are to be embraced within their scope.

What is claimed is:

1. A method for rendering a print job in a computer based printing system, the method comprising:
    initiating a print job at a printing source, said print job comprising print data and print requirements;
    transmitting a print job ticket to a centralized print server that is configured to provide synchronous management of said print job ticket, wherein said print job ticket corresponds to said print job, wherein said centralized print server comprises a job ticket spooler and a print job ticket queue, and wherein said print job ticket is generated by a spooler of said printing source, said print job ticket comprising said print requirements;
    using a printer to initiate despooling of said print job directly to said printer from said printing source, wherein said despooling excludes receipt of said print job by said centralized print server;
    rendering said print job at said printer according to said print requirements;
    transmitting a completion status from said printer directly to said printing source; and
    transmitting a completion message from said printing source to said centralized print server, enabling said centralized print server to monitor progress of said rendering said print job and to manage the despooling of additional print jobs without actively polling said printer.

2. The method of claim 1, wherein said using a printer to initiate despooling of said print job directly to said printer from said printing source comprises:
    using said job ticket spooler to select and remove said print job ticket from said job ticket queue; and
    communicating a print job authorization message.

3. The method of claim 1, wherein said using a printer to initiate despooling of said print data directly to said printer from said printing source comprises:
    using said print job ticket spooler to select and remove said print job ticket from said job ticket queue; and
    communicating a print job authorization message to said printer, said authorization message allowing said specified printer to initiate the despooling of said print data contained on said printing source by sending a despool authorization message to said printing source, said printing source subsequently despooling said print data directly to said specified printer.

4. The method of claim 1, wherein said using a printer to initiate despooling of said print data directly to said printer from said printing source comprises:

using a print processor to instruct said print job ticket spooler to select and remove said print job ticket from said job ticket queue and communicate a print job authorization message to said printing source, said authorization message allowing said printing source to initiate the despooling of said print job.

5. The method of claim 1, wherein said using a printer to initiate despooling of said print data directly to said printer from said printing source comprises:

using a print processor to instruct said job ticket spooler to select and remove said print job ticket from said job ticket queue and communicate a print job authorization message to said printer specified in said selected print job ticket, said authorization message causing said specified printer to initiate the despooling of said print data contained on said printing source by sending a despool authorization message to said printing source, said printing source subsequently despooling said print data directly to said specified printer.

6. A computer based printing system, comprising:

at least one printing source containing one or more print jobs thereon to be printed, said print jobs comprising print data and print requirements;

at least one printer capable of establishing an open connection with a peripheral component to maintain synchronous correlation of data there between, said printer capable of communicating with said printing source, said printing source capable of directly despooling said print data to said printer;

means for initiating said print jobs from within said printing source without receipt of said print jobs by a centralized print server, said means for initiating said print jobs causing said print job requirements to be written to a printer driver contained on and supported by said printing source;

said centralized print server providing synchronous management of said print jobs without receipt of said print jobs, said centralized print server having a job ticket spooler and a job ticket queue correlating with said printer;

a local spooler contained on and supported by said printing source, said local spooler capable of accepting spool data comprising a spool header and print job requirements from said printer driver, wherein said printer driver spools said spool data to said local spooler;

one or more print job tickets corresponding to said print jobs and generated by said local spooler, said print job tickets comprising said print job requirements, wherein said centralized print server is configured to receive said print job tickets, said local spooler being configured to send said print job tickets to said job ticket spooler on said centralized print server, said job ticket spooler being configured to maintain said print job tickets in one or more of said job ticket queues; and means for initiating said print job according to said print job ticket, wherein said printer initiates the despooling of said print data directly to said printer from said printing source, wherein said despooling excludes receipt of said print job by said centralized print server means for transmitting a completion status from said printer directly to said printing source; and means for transmitting a completion message from said printing source to said centralized print server, enabling said centralized print server to monitor progress of said print jobs and to manage the despooling of additional print jobs without actively polling said printer.

7. The computer based printing system of claim 6, wherein said means for initiating said print job comprises said job ticket spooler, which selects and removes said print job ticket from said job ticket queue and communicates a print job authorization message to a particular said printing source as directed by said print job ticket, said authorization message causes said printing source to initiate the despooling of said print data directly to one or more of said printers.

8. The computer based printing system of claim 6, wherein said means for initiating said print job comprises a print processor that instructs said job ticket spooler to select and remove said print job ticket from said job ticket queue and communicate a print job authorization message to a particular said printing source as directed by said print job ticket, said authorization message causes said printing source to initiate the despooling of said print data directly to one or more of said printers.

9. The computer based printing system of claim 6, wherein said means for initiating said print job comprises a print assistant that instructs said job ticket spooler to select and remove said print job ticket from said job ticket queue and communicate a print job authorization message to a particular said printing source as directed by said print job ticket, said authorization message causes said printing source to initiate the despooling of said print data directly to one or more of said printers.

10. The computer based printing system of claim 6, wherein said printer is contained within a printer environment selected from the group consisting of a local environment, a network environment, a remote environment, a peer-to-peer environment, and any combination of these.

11. The computer based printing system of claim 6, wherein said printing source is a client computing device.

12. The computer based printing system of claim 6, wherein said centralized print server is contained on and supported by said client computing device.

13. The computer based printing system of claim 6, wherein said printer driver converts and renders said print job requirements into printer ready data.

14. The computer based printing system of claim 6, wherein said printer driver journals said print job instructions for deferred or delayed printing, said journaled print job instructions having a corresponding device context, said journaled print job instructions and device context converted and saved into an Enhanced Metafile Format.

15. The computer based printing system of claim 6, wherein said spool data comprises a spool header describing spooling needs and resources, and a print job header specifying the requirements of said print job.

16. The computer based printing system of claim 6, wherein said print job ticket comprises information selected from the group consisting of document information, client information, user information, and printer information.

17. The computer based printing system of claim 6, wherein said print job authorization message comprises information selected from the group consisting of document information, printer information, and connection information.

18. The computer based printing system of claim 6, wherein said open connection is established between said job ticket spooler and said printers with a copy of said open connection being provided to said printing source.

19. The computer based printing system of claim 6, wherein said open connection is established between said printing sources and said printer.

20. The computer based printing system of claim 6, wherein said open connection comprises a send portion and a listen portion.

21. The computer based printing system of claim 20, wherein said printing source despools said print data directly to said printer by writing said print data to said send portion of said open connection.

22. The computer based printing system of claim 20, wherein said printer communicates to said printing source the completion of said print job on said listen portion of said open connection.

23. The computer based printing system of claim 20, wherein said open connection and said synchronous correlation comprises synchronous sending and receiving of commands and information between said printer, said centralized print server, said printing sources, and any combination of these.

24. The computer based printing system of claim 6, further comprising means for terminating said print job, wherein said printing source communicates to said printer a print job completion command through said open connection upon completion of said despooling of said print data to said printer, wherein said open connection is closed upon said receipt of said print job completion command by said printer and said print job is terminated.

25. The computer based printing system of claim 6, further comprising means for verifying that said printing source is communicating properly and optimally during and prior to completion of said print job.

26. The computer based printing system of claim 25, wherein said means for verifying comprises an algorithm contained on said job ticket spooler of said centralized print server, said algorithm designed to be executed after a pre-determined interval of time, such that traffic volume on said system is kept to a minimum.

27. The computer based printing system of claim 26, wherein said algorithm may use such factors selected from the group consisting of printer speed, RIP, pre-RIP, spool data size, and response intervals to date.

28. The computer based printing system of claim 26, wherein said job ticket spooler, after said pre-determined interval of time has elapsed, sends a status request to said printing source.

29. The computer based printing system of claim 28, wherein said job ticket spooler considers said printing source to be non-communicating if said printing source is unresponsive within a pre-determined interval of time, upon which said job ticket spooler attempts to determine the progress of said print job by sending a message to said printer to respond with a response to said printing job's current status and progress.

30. The computer based printing system of claim 29, wherein said status request is sent periodically according to a pre-determined schedule, thus allowing said status of said print job to be updated periodically until said print job has been completed or communication is re-established.

31. The computer based printing system of claim 29, wherein said response of said printer is comprised of information selected from the group consisting of printer information, and print job information.

32. The computer based printing system of claim 29, wherein said job ticket spooler does not update said status of said print job until communication is re-established.

33. The computer based printing system of claim 28, wherein said status request is comprised of information selected from the group consisting of printer information, server information, and document information.

34. The computer based printing system of claim 6, further comprising means for verifying that said printer is communicating properly and optimally during and prior to completion of said print job.

35. The computer based printing system of claim 6, wherein said printing source, said centralized print server, and said printer each have authority to suspend, resume, or delete said print job.

36. The computer based printing system of claim 6, wherein said means for initiating said print job comprises said job ticket spooler, which selects and removes said print job ticket from said job ticket queue according to an identified algorithm, and communicates a print job authorization message to one or more of said printers as specified in said selected print job ticket, said authorization message causes said specified printers to initiate the despooling of said print data from each of said printing sources by sending a despool authorization message to said printing sources, said printing sources subsequently despooling said print data directly to said specified printers.

37. The computer based printing system of claim 6, wherein said means for initiating said print job comprises a print processor or print assistant that instructs said job ticket spooler to select and remove said print job ticket from said job ticket queue according to an identified algorithm, and to communicate a print job authorization message to one or more of said printers as specified in said selected print job ticket, said authorization message causes said specified printers to initiate the despooling of said print data from each of said printing sources by sending a despool authorization message to said printing sources, said printing sources subsequently despooling said print data directly to said specified printers.

38. The computer based printing system of claim 6, wherein said job ticket spooler, after said pre-determined interval of time has elapsed, sends a status request to said printer.

39. The computer based printing system of claim 38, wherein said job ticket spooler considers said printer and said printing source to be non-communicating if said printer is unresponsive within a pre-determined interval of time, upon which said job ticket spooler continuously polls said printer over an identified interval until communication is re-established.

40. The computer based printing system of claim 39, wherein said job ticket spooler considers said printing source non-communicating if said printer is responsive to said continuous poll, but there is no change in progress of said print job.

41. The computer based printing system of claim 38, wherein said status request is comprised of information selected from the group consisting of client information, server information, and document information.

42. A method for rendering a print job in a computer based printing system, the method comprising:
  initiating a print job at a printing source, said print job comprising print data and print requirements;
  generating a print job ticket at said printing source, said print job ticket corresponding to said print job and comprising said print requirements;
  transmitting said print job ticket to a print server configured to provide synchronous management of said print job ticket, wherein said print server comprises a job ticket spooler and a print job ticket queue;
  transmitting an authorization to despool said print job directly from said print server to said printing source;

using said printing source to initiate despooling of said print job directly to a printer from said printing source, wherein said despooling excludes receipt of said print job by said print server; and rendering said print job at said printer according to said print requirements;

transmitting a completion status from said printer directly to said printing source; and transmitting a completion message from said printing source to said centralized print server, enabling said centralized print server to monitor progress of said rendering said print job and to manage the despooling of additional print jobs without actively polling said printer.

43. The method of claim 42, wherein said transmitting an authorization to despool said print job directly from said print server to said printing source comprises:

using said job ticket spooler to select and remove said print job ticket from said job ticket queue; and communicating a print job authorization message based on said print job ticket to said printing source.

44. The method of claim 42, wherein the printing source comprises an enhanced spooler that generates said print job ticket, transmits said print job ticket to said print server, and initiates despooling of said print job directly to said printer.

45. The method of claim 42, wherein the printing source comprises a print processor that generates said print job ticket, transmits said print job ticket to said print server, and initiates despooling of said print job directly to said printer.

46. The method of claim 42, further comprising:

establishing an exclusive open connection between said print server and said printer; and passing a copy of the exclusive open connection to said printing source.

47. The method of claim 46, further comprising:

providing a status update from said printer to said printing source; and transmitting a status message from said printing source to said print server.

* * * * *